United States Patent [19]

Kosmyna

[11] Patent Number: 5,067,518

[45] Date of Patent: Nov. 26, 1991

[54] PRESSURE FEED PAINT CUP VALVE

[75] Inventor: Michael J. Kosmyna, Toledo, Ohio

[73] Assignee: Ransburg Corporation, Indianapolis, Ind.

[21] Appl. No.: 694,437

[22] Filed: May 1, 1991

[51] Int. Cl.[5] .............................................. F16K 15/18

[52] U.S. Cl. .................................... 137/588; 137/522; 137/596.2; 137/901; 239/373; 251/83

[58] Field of Search ..................... 137/522, 588, 596.2, 137/901; 239/339, 373; 251/83

[56] References Cited

U.S. PATENT DOCUMENTS

| | | | |
|---|---|---|---|
| 1,832,570 | 11/1931 | Montgomery | 239/373 |
| 2,164,911 | 7/1939 | Garverick | 137/596.2 X |
| 4,146,053 | 3/1979 | Corrigan | 137/588 |

OTHER PUBLICATIONS

Mar. 14, 1990 Drawing No. TGC-420-1 by The DeVilbiss Company.

*Primary Examiner*—Robert G. Nilson
*Attorney, Agent, or Firm*—MacMillan, Sobanski & Todd

[57] ABSTRACT

A valve for a pressure feed paint cup. An adapter is attached to a lid for the cup. A check valve assembly is secured to a threaded end of the adapter which extends below the lid and a vent valve is secured to a threaded end of the adapter which extends above the lid. An air line is attached to the vent valve to supply pressurized air to the paint cup. The check valve has a spherical valve ball which engages a conical valve seat near the diameter of the ball to increase the seating force without increasing the valve opening force. The valve seat and the valve ball are formed from low friction materials. A valve stem is manually moved to first open a vent valve which vents air pressure from the air line and then to move the valve ball from its conical seat.

6 Claims, 2 Drawing Sheets

PRESSURE FEED PAINT CUP VALVE

TECHNICAL FIELD

The invention relates to a paint cup for feeding paint under pressure to a spray gun and more particularly to an improved combination check valve and pressure relief valve for a pressure feed paint cup.

BACKGROUND ART

When painting with a hand held spray gun, paint is fed to the gun either from a paint cup attached directly to the gun or from a remote paint cup connected through a paint hose to the gun. When the cup is attached to the gun, the paint may flow to a paint atomizing nozzle either through suction feed or through pressure feed established by pressurizing the cup. For remote cups, the paint is supplied under pressure. One general class of spray gun uses a flow of pressurized air for atomizing the paint as it is discharged from the nozzle. Within this class of spray gun, there are spray guns which use a low volume flow of high pressure compressed air and there are spray guns designed to operate from high volume low pressure (HVLP) air. HVLP spray guns operate with air at the nozzle at no more than 10 psig to meet regulatory requirements in jurisdictions such as California. The low volume high pressure air atomization spray guns often use the atomization air flow to create suction for causing paint to flow from a cup to the nozzle, where the air flow atomizes the paint. For an HVLP gun, there generally is insufficient air pressure at the nozzle to establish suction paint feed to the nozzle. Consequently, the paint cup must be pressurized to feed or at least assist feeding the paint to the nozzle. An HVLP spray gun may operate from a turbine which supplies the HVLP air, or it may operate from a high pressure air source. When the gun is designed to operate from a high pressure air source, one or more calibrated orifices are used to drop the air pressure to the desired low pressure for atomization and for pattern shaping and at the same time to increase the volume of the air flow.

When using high pressure air for atomization, the atomization air pressure may be between 40 psig and 100 psig (between 2.8 Kg/cm$^2$ and 7 Kg/cm$^2$), for example. At these pressures, a variation of 6 psig to 8 psig (0.42 Kg/cm$^2$ to 0.56 Kg/cm$^2$) in the paint feed pressure has little adverse effect on atomization. For an HVLP spray gun, the paint cup may be pressurized to, for example, to between 0 and 15 psig (between 0 and 1.05 Kg/cm$^2$). The actual pressure used depends on the properties of the paint being atomized. For lower cup pressures, the paint cup may be pressurized by low pressure air from the nozzle applied through a check valve to the cup. For higher cup pressures, high pressure air must be used before it is dropped to the lower pressure required for atomization. The high pressure air is applied through a pressure reducing valve or orifice and a check valve to the cup. The check valve, which is mounted on the cup lid, prevents paint from entering the air passages and also maintains the cup pressure while the gun air flow is off. The check valve also may incorporate a pressure relief valve for manually venting the paint cup by pressing a valve button on top of the cup lid. Problems have occurred with prior art check valves used in low pressure systems when trying to control cup pressure to within 2 to 3 psig (0.14 to 0.21 Kg/cm$^2$). Prior art check valves often required a pressure differential between the air supply and the cup of 3 to 4 psig (0.21 to 0.28 Kg/cm$^2$) to open the valve and paint film accumulation on prior art valves has often increased the pressure differential to 6 to 8 psig (0.42 to 0.56 Kg/cm$^2$) required to open the valve. Such a wide pressure differential makes it difficult to regulate the cup pressure to the desired accuracy. The prior art paint cup valves also are generally not easily removed from the cup lid for cleaning. Removal of many prior art valves requires tools for disassembly of the valve. The small valve parts are easily lost and may be difficult to reassemble.

DISCLOSURE OF INVENTION

According to the invention, an improved valve assembly is provided for a pressure feed paint cup. The valve has a low opening pressure and, therefore, is particularly suitable for a pressure feed paint cup for use with HVLP spray guns. Further, the portion of the valve within the paint cup may be removed and reinstalled as a unit to facilitate cleaning. No tools are required for valve removal.

The valve includes a generally tubular adapter having externally threaded upper and lower ends separated by a radial flange. The lower end is secured to a threaded opening through a paint cup lid and projects below the lid. A check valve body is threaded onto the projecting lower end. The check valve body has a central opening which is shaped to form a conical valve seat. A spring urges a ball against the seat to form an inlet air check valve. The spring and ball are retained in the valve body so that the check valve may be removed from the lid as a unit. The ball engages the conical seat near the diameter of the ball to increase the seating force without increasing the valve opening force. The valve seat and the valve ball are formed from a low friction material, such as Teflon (polytetrafluoroethylene). Preferably, the diameter of the ball and the size of the spring are selected to allow the check valve to open at no more than about 0.5 psig (0.035 Kg/cm$^2$).

A vent valve body is attached to the threaded upper adapter end. The vent valve body has; an interior opening which includes a conical valve seat. An axially movable valve stem is positioned within the vent valve body. The valve stem includes an integral flange having a spherical surface for engaging the conical valve seat. Above the spherical surface, an upper end of the valve stem projects from the vent valve body to form a button. The valve stem has a second end which extends through the adapter and terminates adjacent the ball. An air hose fitting is threaded into the vent valve body to supply pressurized air to a paint cup attached to the lid.

In operation, air pressure is applied through the fitting to the vent valve body. The air pressure urges the spherical surface on the valve stem against the adjacent conical seat. If the applied air pressure is slightly greater than the pressure in the paint cup, the pressure acting on the ball moves the ball from its adjacent seat and air flows into the cup. When the cup pressure reaches substantially the applied pressure, the spring urges the ball against its adjacent conical seat. Pressing the button end of the valve stem projecting above the lid initially moves the spherical valve surface on the stem from its adjacent seat to vent the applied pressure and then moves the ball from its seat to vent the paint cup. If necessary, the check valve is readily removed from the lid as an assembly.

Accordingly, it is an object of the invention to provide an improved valve for a pressure feed paint cup.

Other objects and advantages of the paint cup valve will be apparent from the following detailed description and the accompanying drawings.

BEST MODE FOR CARRYING OUT THE INVENTION

Figure 1:
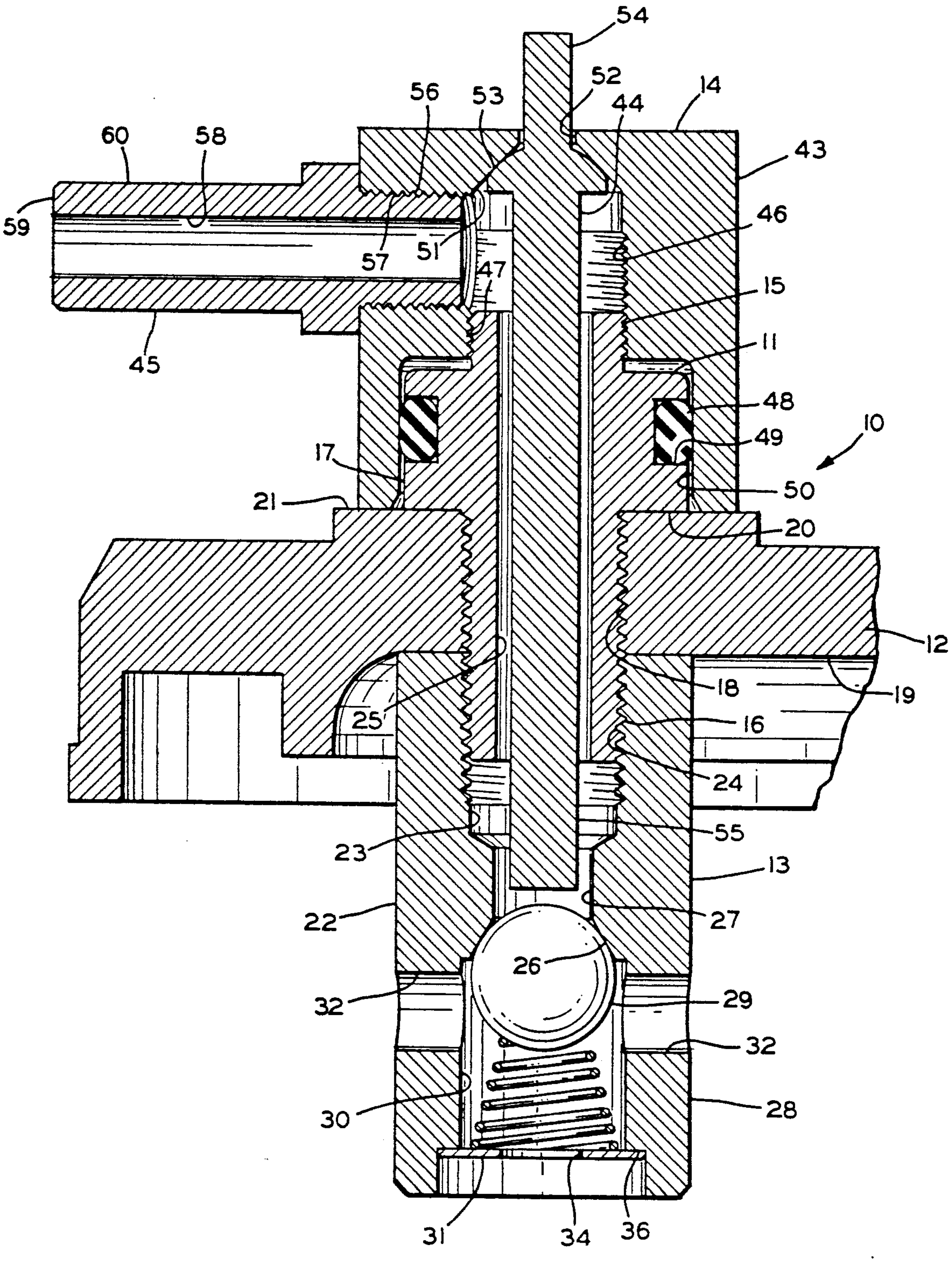
FIG. 1 is an enlarged vertical cross sectional view through a valve according to the invention attached to a fragmentary portion of a paint cup lid.
Figure 2:
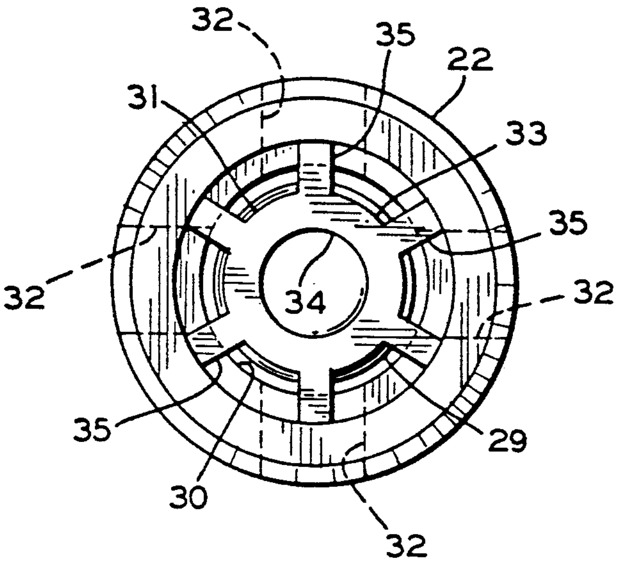
FIG. 2 is a bottom view of the valve of FIG. 1.

Referring to FIGS. 1 and 2 of the drawings, a pressure feed paint cup valve 10 is shown according to a preferred embodiment of the invention. The valve 10 includes an adapter 11 secured to a paint cup lid 12, a check valve assembly 13 secured under the lid 12 to the adapter 11, and a vent valve 14 secured above the lid 12 to the adapter 11. The adapter 11 is generally tubular and has a threaded upper end 15, a threaded lower end 16 and a radial flange 17 separating the upper and lower ends 15 and 16. The threaded lower end 16 is secured to a threaded hole 18 through the lid 12 and projects below a lower surface 19 of the lid 12. A lower surface 20 on the flange 17 seats against an upper surface 21 on the lid 12.

The check valve assembly 13 includes a body 22 having a stepped central opening 23. An upper end 24 of the opening 23 is threaded for removably securing the check valve assembly 13 to the threaded adapted end 16. When the check valve assembly 13 is secured to the adapter 11, the opening 23 is in axial alignment with and communicates with an axial opening 25 through the adapter 11. A conical seat 26 is formed in a central portion 27 of the opening 23. A tapered helical stainless steel compression spring 28 urges a ball 29 against the conical seat 26. Preferably, both the valve body 22 and the ball 29 are formed from a low friction material such as Teflon (polytetrafluoroethylene) to minimize the valve opening force, to reduce paint accumulation on the valve 13, and to facilitate cleaning. A lower portion 30 of the opening 23 forms a cage for the ball 29. A clip 31 retains the spring 28 and the ball 29 in the lower portion 30. A plurality of radial holes 32 extend from the lower portion 30 through the body 22 for venting air passing through the check valve assembly 13 into the paint cup. The clip 31 is shown most clearly in FIG. 2. The clip 31 has an annular portion 33 surrounding a central opening 34. A plurality of radially directed fingers 35 project from the annular portion 33. The fingers 35 form a circle having a diameter slightly greater than the diameter of the lower opening portion 30. The clip 31 is pressed into the lower opening portion 30 to abut a step 36. The clip 31 is stamped from a resilient metal, such as from a thin sheet of stainless steel. When the clip 31 is pressed into the lower portion 30, the fingers 35 deflect and retain the clip 31 in the lower opening 30 to retain the spring 28 and the ball 29. Openings between the clip fingers 35, the annular portion 33 and the body 22 and the clip opening 34 allow any paint which may enter the lower opening 30 to drain.

Figure 3:
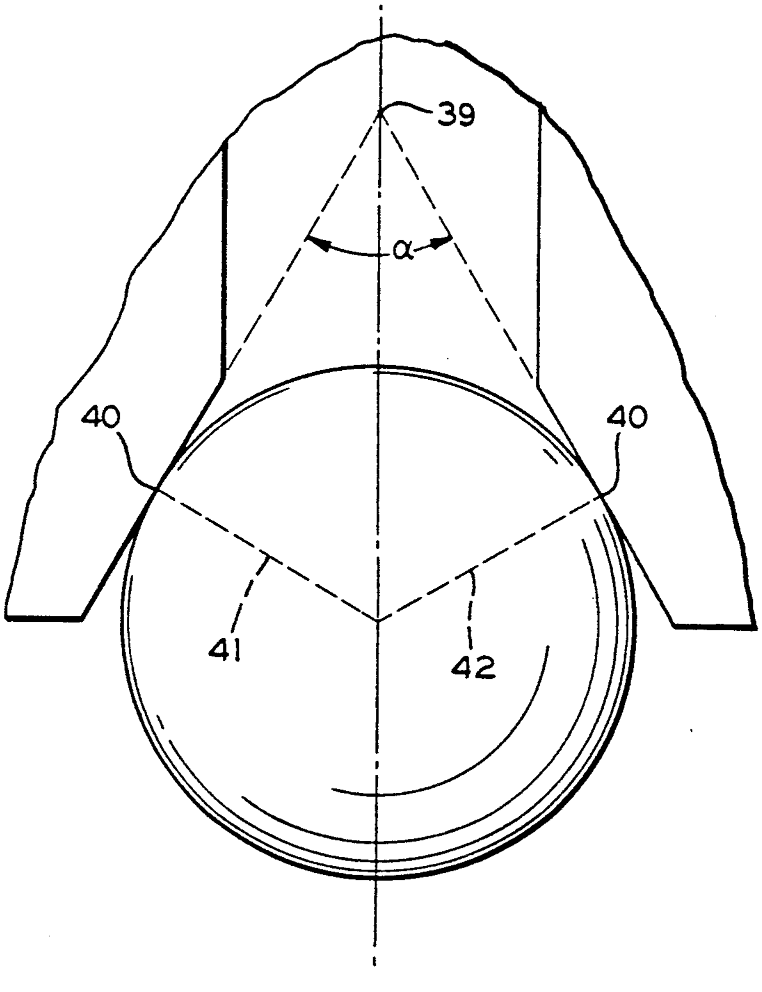
FIG. 3 is an enlarged fragmentary view showing details of the valve ball and the adjacent valve seat.

Prior art check valves for paint cups require a relatively high air pressure differential to open, especially when a film of paint is present at the valve seat. When a ball valve was used in the prior art, a small diameter ball was selected to minimize the wetted surface between the ball and the valve seat. It was believed that it was important to minimize the wetted contact area. By constructing the conical valve seat to have a relatively small included angle and using a relatively large diameter ball, the air pressure differential required to unseat the ball is minimized and the effective force between the ball and the seat is increased. The angle of the valve seat is selected so that the seat and the ball contact near the diameter of the ball. Preferably, if the conical valve seat 26 is extended to an apex 39 as shown in FIG. 3, the included $\alpha$ angle at the apex 39 is no greater than about 60°. Consequently, the ball 29 contacts the valve seat 26 at a point 40 near the diameter of the ball 29. By increasing the diameter of the contact point 40 over prior art ball check valves for paint cups, the lineal paint wetted surface at the seat is increased in direct proportion to the diameter increase while the area acted on by the air pressure differential is increased in proportion to the square of the diameter increase. Consequently, the air pressure differential required to open a ball type check valve decreases with a larger diameter ball, in spite of the larger wetted surface at the valve seat. For example, a prior art check valve used a 5/32 inch (3.97 mm) diameter ball, while a check valve according to a preferred embodiment of the invention used a 7/32 inch (5.56 mm) diameter ball. This results in an increase in the wetted surface at the valve seat by a factor of 1.40 and an increase in the area acted on by the air pressure by a factor of 1.96. Using the same spring as was used in the prior art valve permitted the valve according to the invention to open with an air pressure differential of only 0.5 psig (0.035 $Kg/cm^2$). Subject to space limitations, an even larger diameter ball may be used. Also, by contacting the valve ball 29 against the conical seat 26 near the diameter of the ball 29, vector of the axially directed spring force in a direction perpendicular to the seat (as represented by the dashed lines 41 and 42) is increased over the spring force by a factor of at least 2.

Referring again to FIG. 1, details are shown for the vent valve 14. The vent valve 14 includes a valve body 43, a valve stem 44 and an air hose fitting 45. The valve body 43 includes a stepped central opening 46 having a threaded intermediate section 47 which engages the threaded upper end 15 of the adapter 11. An O-ring 48 is located in a groove 49 around the perimeter of the adapter flange 17. The opening 46 in the vent valve body 43 has a lower portion 50 which extends over the adapter flange 17 and engages the O-ring 48 to form an air tight seal between the adapter 11 and the valve body 43. A conical valve seat 51 is formed adjacent an upper end 52 of the opening 46. The valve stem 44 has an enlarged diameter spherical surface 53 which in combination with the seat 51 forms a vent valve to prevent air leakage through the upper opening end 52. A release button 54 extends coaxially through the upper opening end 52. A clearance is provided between the button 54 and the upper opening end 52 to allow pressurized air to escape through the upper opening end 52 when the button 54 is pressed to move the spherical surface 53 from the seat 51.

The valve stem 44 also has a lower end 55 which extends from the spherical surface 53 coaxially through the adapter opening 25 to adjacent the check valve ball 29. Normally, the valve stem end 55 is spaced from the ball 29. However, when the valve button 54 is pressed, the valve stem end 55 pushes the ball 29 from its seat 26. Air pressure in the paint cup then is vented through an annular space between the lower valve stem end 55 and the adapter opening 25 and between the spherical surface 53 and the adjacent seat 51. It will be seen from FIG. 1 that pressing the valve button 54 will cause the spherical surface 53 to separate from the seat 51 before the ball 29 is separated from the seat 26.

The air hose fitting 45 has a threaded end 56 which engages a correspondingly threaded opening 57 in the valve body 43. A central passage 58 through the fitting 45 communicates with the valve body opening 46. The fitting 45 has an end 59 for receiving an air hose (not shown). An exterior surface 60 on the end 59 may be smooth, as shown, or it may form ridges or barbs for retaining an air hose, as is well known in the art.

During operation of a spray gun (not shown) connected to a paint cup containing the lid 12, air pressure is applied to the fitting 45. When a sufficient pressure differential occurs between the applied pressure and the paint cup pressure, the ball 29 separates from the seat 26 and air flows between the lower valve stem end 55 and the adapter opening 25 and then between the ball 29 and the seat 26 into the paint cup. When the pressures are nearly equal, the spring 28 seats the ball 29 against the seat 26 to close the check valve. When the applied air pressure is momentarily interrupted, for example, when spraying is stopped, the check valve assembly 13 maintains the paint cup pressure. When painting is completed or when the paint cup must be opened, pressure is released by pressing the button 54. If it is necessary to clean the check valve assembly 13, it may be unscrewed from the adapter 11 without the need to use any special tools. Further, the spring 28 and the ball 29 are retained in the valve body 22 while it is unscrewed from the adapter 11 and the valve stem 44 is still retained with the lid 12 to facilitate cleaning and reassemble.

It will be appreciated that various modifications and changes may be made in the valve 10 for a pressure feed paint cup without departing from the spirit and the scope of the following claims.

I claim:

1. A valve for securing to the lid for a pressure feed paint cup comprising an adapter secured to the paint cup lid, said adapter having a first threaded end located within the paint cup, a second threaded end located outside of the paint cup and a passage extending between said ends, a check valve assembly including a first body threaded onto said first adapter end, said first body defining an interior passage communicating with said adapter passage, a ball and spring retained within said first body passage, said spring urging said ball against a conical seat in said first body passage, a vent valve assembly including a second body threaded onto said second adapter end, said second body defining an interior passage communicating with said adapter passage, a valve stem having a spherical surface seated against a conical seat in said second body passage, means for supplying pressurized air through said second valve body passage, said adapter passage and through said first valve body passage to pressurize the paint cup, such air deflecting said spring to flow between said ball and said conical seat in said first body passage, and means for separating said spherical valve stem surface from said second body seat and for simultaneously separating said ball from said first body seat to vent pressure from the paint cup.

2. A valve for securing to the lid for a pressure feed paint cup, as set forth in claim 1, wherein said conical seat in said first body lies on a cone having an included apex angle of no greater than about 60°.

3. A valve for securing to the lid for a pressure feed paint cup, as set forth in claim 2, wherein said first body and said ball are formed from polytetrafluoroethylene.

4. A valve for securing to the lid for a pressure feed paint cup, as set forth in claim 3, wherein said ball has a sufficiently large diameter relative to the force of said spring to separate from said conical seat in said first body passage in response to an applied air pressure differential of no greater than 0.5 psig.

5. A valve for securing to the lid for a pressure feed paint cup, as set forth in claim 4, wherein said ball has a diameter of at least 7/32 inch.

6. A valve for securing to the lid for a pressure feed paint cup, as set forth in claim 1, wherein said separating means comprises a manually actuated button on said valve stem projecting from said second valve body passage and wherein said valve stem extends through said adapter to adjacent said ball, said valve stem moving said ball from said first body seat when said button is manually depressed.

* * * * *